United States Patent [19]

Serfaty

[11] Patent Number: 5,293,401
[45] Date of Patent: Mar. 8, 1994

[54] EQUALIZER FOR LINEAR MODULATED SIGNAL

[75] Inventor: Salomon Serfaty, Doar Gaash, Israel

[73] Assignee: Motorola, Inc., Schaumburg, Ill.

[21] Appl. No.: 754,869

[22] Filed: Sep. 4, 1991

[30] Foreign Application Priority Data

Sep. 6, 1990 [GB] United Kingdom ............ 9010508.2

[51] Int. Cl.[5] .............................................. H03H 7/30
[52] U.S. Cl. ......................................... 375/13; 375/14; 364/724.2
[58] Field of Search ................... 375/11, 12, 13, 14; 333/28 R; 364/724.2

[56] References Cited

U.S. PATENT DOCUMENTS

| | | | |
|---|---|---|---|
| 4,674,103 | 6/1987 | Cheviddat et al. | 375/13 |
| 4,985,902 | 1/1991 | Gurcan | 375/14 |
| 5,031,194 | 7/1991 | Crespo et al. | 375/14 |
| 5,031,195 | 7/1991 | Cheviddat et al. | 375/14 |
| 5,052,000 | 9/1991 | Wang et al. | 375/14 |
| 5,065,411 | 11/1991 | Muto | 375/14 |
| 5,068,873 | 11/1991 | Murakami | 375/13 |
| 5,119,401 | 6/1992 | Tsujimoto | 375/14 |

Primary Examiner—Curtis Kuntz
Assistant Examiner—Young Tse
Attorney, Agent, or Firm—Wayne J. Egan

[57] ABSTRACT

This invention relates to an equalizer for equalization of a linear modulated signal received in blocks or frames over a radio channel. The impulse response of the channel is estimated during training sequences before and after a frame and interpolation is used to estimate the impulse response at each point in the frame. From this, the coefficients of an equalizer (24, 26) are calculated for equalising the signal. Various further improvements are described. The technique is particularly applicable to land mobile radio systems using 16 QAM or other linear modulation schemes.

10 Claims, 5 Drawing Sheets

Receiver including DFE

FIG. 1

FIG. 2 - *Frame structure*

FIG. 3 - *Receiver including DFE*

1. Every N symbols the impulse response is evaluated from the known training sequence.
2. Two impulse responses are evaluated corresponding to T/2 time shifts.
3. Time reversal procedure is needed when decoding from both sides.
4. Gamma (K) indicates the position of the main lobe of the impulse response.

*FIG. 4* - *Flow graph of decoding procedure*

FIG. 5 - *Residual BER vs rms delay*

FIG. 7 - *Floating midpoint decoding*

FIG. 6 - Equalizer including forward whitening filter, Viterbi decoder and feedback DFE FIG. 8 - Flow diagram of decoding process

EQUALIZER FOR LINEAR MODULATED SIGNAL

BACKGROUND OF THE INVENTION

This invention relates to an equalizer for equalization of a linear modulated signal received in blocks or frames. The technique is particularly applicable to land mobile radio systems using 16 QAM or other linear modulation schemes.

SUMMARY OF THE PRIOR ART

In a land mobile environment, the channel is characterized by both Rayleigh fading and multipath spread. If highly efficient linear modulation schemes such as M-QAM are used to convey information in the channel, special techniques are required to handle those impairments.

Rayleigh fading can be compensated for by using an embedded pilot as done in S. Sampei and T. Sunaga, "Rayleigh fading compensation method for 16 QAM in digital land mobile radio channels", Proc. Conf. Vehicular Technology, pp. 640–646, 1989. To overcome the multipath effect, adaptive equalization could be used. If both effects coexist in the channel, the use of one of the techniques depends on several factors. When the channel is slowly varying, adaptive equalization techniques can still be used in the form of least mean square or recursive least squares, such as is described in E. Eleftherious and D. D. Falconer, "Adaptive equalization techniques for HF channels", IEEE Journal on Selected Areas in Communications", vol. SAC-5 no. 2, February 1987.

When the multipath delay spread is not high, FDM techniques can be used to divide the channel into subchannels. For each subchannel, it is assumed that the fading is flat. An embedded pilot is inserted in the subchannel to compensate for the unknown gain.

The combination of fast varying channel and large multipath delay spread makes the compensation task quite complicated. Instead of an embedded pilot, a predetermined known sequence can be used as described in UK Patent Application No. 9006106.0 of Motorola Inc.

It is a problem with periodic training sequences that the impulse response function of the channel changes between one sequence and the next, giving rise to difficulties in setting appropriate co-efficients for the equalizer to compensate for Rayleigh fading and multipath spread changes within the frame.

SUMMARY OF THE INVENTION

According to one aspect of the invention, an equalizer is provided for equalising a linear modulated signal, containing periodic predetermined sequences for training, received over a radio channel, comprising: means for receiving a first training sequence and estimating the impulse response of the channel during receipt of the first training sequence; means for receiving and storing samples following said training sequence; means for receiving a second training sequence following said samples and estimating the impulse response of the channel during receipt of the second training sequence; means for interpolating between the estimated impulse responses and setting coefficients of the equalizer depending on interpolation of the estimated impulse responses; and means for reading the stored received samples from memory and equalising them in the equaliser using the coefficients so set, thereby to compensate for Rayleigh fading and multipath spread on the channel.

In this manner, the training sequence received before and after the frame are used in setting the co-efficients for equalization of the frame.

The interpolation may be parabolic, "ideal" or other interpolation, but it is preferably linear.

The equalizer preferably comprises a forward FIR filter, decision means (e.g. a slicer or a Viterbi equalizer) and a feedback FIR filter, the feedback filter operating on detected symbols from the decision means, the decision means providing the output of the equalizer, and the decision means operating on a combination of the outputs of the forward and reverse filters.

Means may be provided for updating the coefficiences of the forward filter less frequently than the updating of the interpolated impulse response.

In a further refinement, means are provided for setting the equalizer coefficiencts for a first part of a frame between training sequences and decoding symbols in the first part of the frame in a sequence forwarding time and using a permutation of the coefficients of the impulse response to determine the coefficients of the equalizer coefficients for the second part of the frame in a sequence reversed in time.

The first and second parts of the frame may be equal halves of the frame, however in a further refinement, the first and second parts of the frame are variable in length, separated a floating midpoint. The position of the midpoint is determined by a measure of the quality of the decoding throughout the frame for forward and reverse decoding (e.g. the Euclidian metric accumulation of a Viterbi decoder). Forward decoding is used for that part of the frame where forward decoding provides a higher measure of quality of decoding and reverse decoding for that part of the frame where reverse decoding provides a higher measure of quality of decoding.

Thus the preferred embodiment of the invention takes advantage of the realisation that in certain circumstances, the co-efficients of the impulse response function are equal to a permutation of the co-efficients of the response function reversed in time. In the preferred feature, the equalizer co-efficients for the first half of a frame are set and the symbols are decoded in a sequence forward in time, while a permutation of the same coefficients are used as equalizer co-efficients for the second half of the frame and that half of the frame is decoded reversed in time.

In another aspect of the invention, two impulse responses are estimated at two different time intervals and the impulse response having more energy concentration or less non-causal energy is selected for the purpose of setting the equalizer co-efficients. The two different time instances may, for example, be separated by half a symbol in time.

More generally, the sampling means are preferably arranged to sample the signal at N sets of sampling points, the points of each set being offset successively by 1/N symbol intervals from the corresponding points of a preceding set, and the means for estimating are arranged to estimate N impulse responses.

DESCRIPTION OF A PREFERRED EMBODIMENT

A transmitter for transmitting a 16 QAM signal can be readily implemented by one skilled in the art. A serial bit stream is fed to a serial-to-parallel converter to produce at its output groups of four bits, for example. Those four bits are mapped into one of 16 QAM possible symbols. Other M-QAM modulation schemes can also be considered. The symbol rate at the output of the modulator is equal to R symbols/sec. A pulse shaping filter can be used to confine the power spectral density at the output of the transmitter. As an example, the transmit filter is a square root raised cosine with an excess bandwidth a equal to 0.4 as described in R. W. Luck, J. Salz and E. J. Weldon, "Principles of data communications", New York, N.Y., McGraw-Hill 1968.

In the example, it will be assumed that the symbol rate is 16 ksymb/sec, which is adequate for 25 KHz channels in the 800 and 900 MHz bands.

Figure 1:
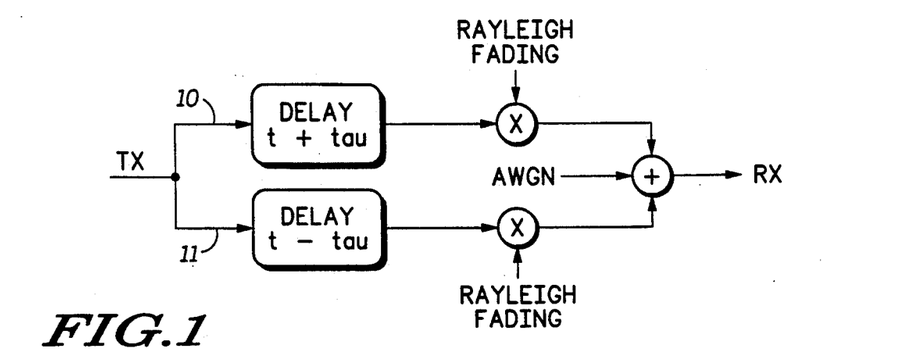
FIG. 1 shows a channel model for an RF channel with Rayleigh fading and multipath spread.

A channel model is presented in FIG. 1. The multipath delay spread model is approximated by a two-ray model. This is quite accurate when the rms delay spread is smaller than the inverse of the channel bandwidth. The signal in the upper path 10 of FIG. 1 is delayed by $t+\tau$ while that of the lower path 11 by $t-\tau$, where t is some constant and $\tau$ represents the rms delay spread. Both rays are independently Rayleigh faded.

Figure 2:
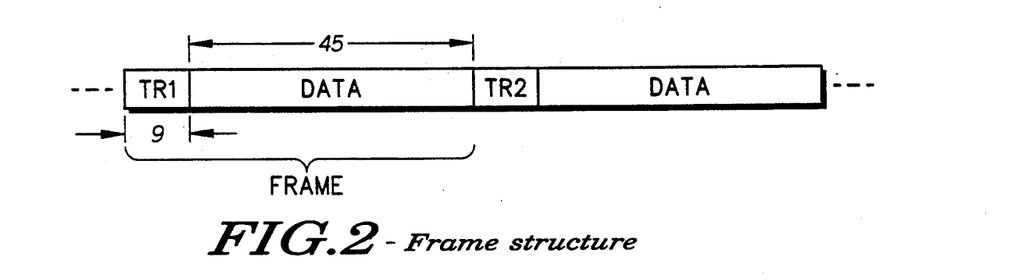
FIG. 2 shows the frame structure of a received signal used in the invention.

For the purposes of the present example, the transmitter (not shown) will be assumed to transmit frames of data having a structure shown in FIG. 2, with blocks of 45 symbols of data (N=45) and 9 symbols for training. The training sequences separate the blocks of data.

Figure 3:
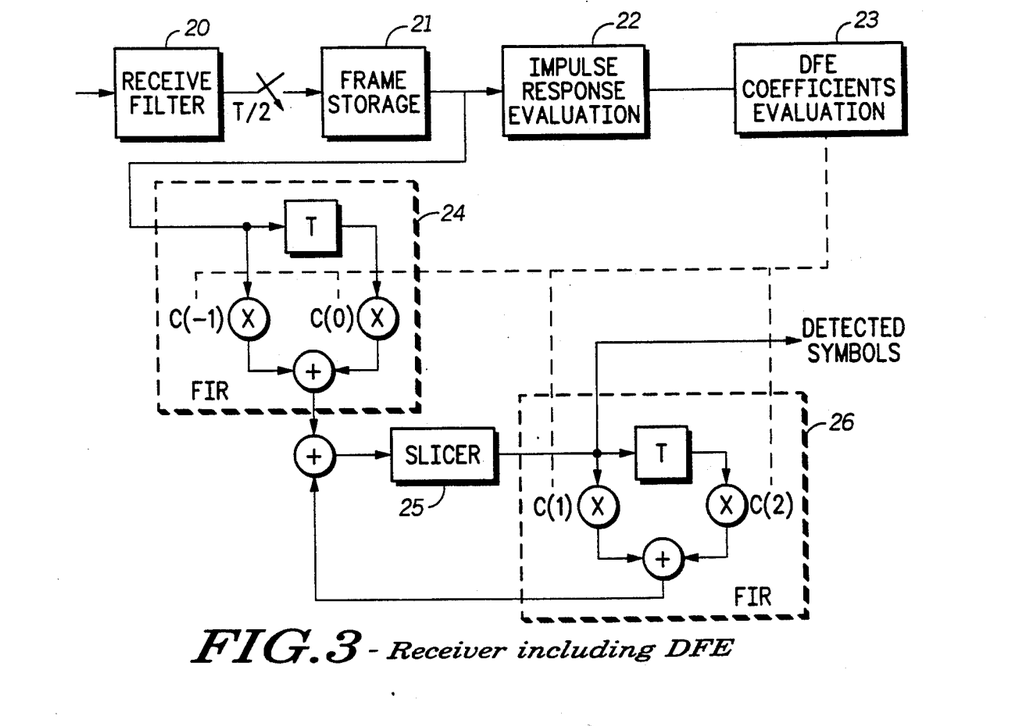
FIG. 3 shows a block diagram of the receiver and equalizer in accordance with a first embodiment of the invention.

Referring now to FIG. 3, a receiver and equalizer in accordance with a first embodiment of the invention are shown, comprising a receive filter 20, frame storage memory 21, impulse response evaluator 22 and DFE (decision feedback equalizer) co-efficients evaluator 23. The diagram shows an equalizer 24 in the form of a forward finite impulse response ("FIR") filter in dotted outline, a bit slicer 25 and a decision feedback equalizer 26 in the form of a feedback FIR filter, also in dotted outline.

The values emerging from the receive filter 20 are stored on a frame-by-frame basis in the frame storage memory 21. As one frame is being stored, the previously received frame is read out of memory and the values received are fed through the equalizer 24. Equalizer 24 is shown as having just two taps, with tap co-efficients C(−1) and C(0). It will, of course, be understood that more taps can be used. The delay between the taps is equal to 1 symbol length T. The output from the equalizer 24 is fed to the slicer 25 and the output of the slicer provides the detected symbols. Before feeding the samples to the slicer, feedback equalization is provided from feedback equalizer 26. Feedback equalizer 26 similarly comprises two taps and a delay of one symbol length between the taps. The tap co-efficients are C(1) and C(2). The feedback equalizer 26 takes the output of the slicer as its input. A decision feedback equalizer is described in the paper by R. W Lucky et al referred to above.

The setting of the co-efficients of the DFE 26 will now be described in greater detail.

The coefficients of the DFE are determined from the estimated impulse response of the channel. The number of forward and backward coefficients of the DFE will determine the number of terms of the impulse response. Assuming negligible noise, the equations that govern the coefficients of the DFE are:

Forward co-efficients ($-k_1$ to 0)

$$\sum_{j=-k_1}^{0} \psi_{lj} c_j = f^*_{-l} \quad l = -k_1, \ldots, 0 \tag{1}$$

where $$\psi_{lj} = \sum_{m=0}^{-l} f^*_m f_{m+l-j} \tag{2}$$

and $f_i$ and $c_i$ are the coefficients of the impulse response of the channel and the forward coefficients of the DFE respectively.

Feedback coefficients (1 to $k_2$)

$$c_k = -\sum_{k=-k_1}^{0} c_j f_{k-j} \quad k = 1, 2, \ldots, k_2 \tag{3}$$

where $c_i$ are the feedback coefficients of the DFE.

The matrix $\Psi$ is a $(k_1+1) \times (k_1+1)$ matrix. If, as an example, we assume that the DFE has two forward coefficients and two feedback coefficients (notation: DFE(2,2)), it is clear from (1), (2) and (3) we need to determine the coefficients of the impulse response given by the vector.

$$f = \{f_{-1}, f_0, f_1, f_2, f_3\} \tag{4}$$

Assume now that the impulse response of the channel is effectively given by Eq. (4). Assume also that a training sequence $a_i$, i=0,1,... is sent and that the impulse response does not change for the duration of the training sequence. The output of the receiver, starting at mT, will be:

$$
\begin{aligned}
r_m &= a_0 f_{-1} + b_n f_0 + b_{n-1} f_1 + b_{n-2} f_2 + b_{n-3} f_3 \\
r_{m+1} &= a_1 f_{-1} + a_0 f_0 + b_n f_1 + b_{n-1} f_2 + b_{n-2} f_3 \\
r_{m+2} &= a_2 f_{-1} + a_1 f_0 + a_0 f_1 + b_n f_2 + b_{n-1} f_3 \\
r_{m+3} &= a_3 f_{-1} + a_2 f_0 + a_1 f_1 + a_0 f_2 + b_n f_3 \\
r_{m+4} &= a_4 f_{-1} + a_3 f_0 + a_2 f_1 + a_1 f_2 + a_0 f_3 \\
r_{m+5} &= a_5 f_{-1} + a_4 f_0 + a_3 f_1 + a_2 f_2 + a_1 f_3 \\
r_{m+6} &= a_6 f_{-1} + a_5 f_0 + a_4 f_1 + a_3 f_2 + a_2 f_3 \\
r_{m+7} &= a_7 f_{-1} + a_6 f_0 + a_5 f_1 + a_4 f_2 + a_3 f_3 \\
r_{m+8} &= a_8 f_{-1} + a_7 f_0 + a_6 f_1 + a_5 f_2 + a_4 f_3
\end{aligned}
\tag{5}
$$

In the above equations, $b_i$ are random 16 QAM symbols that precede and follow the transmission of the training sequence $a_i$. It can be seen that the impulse response of the channel can be determined from $r_{m+4}$ to $r_{m+8}$. This requires the solution of a system of five equations with five unknowns, i.e., $f_{-1}, f_0, \ldots, f_3$. This point is discussed in greater detail below. Note however that in order to determine the impulse response of the channel of the form given by Eq. (4), the length of the training sequence should be equal to nine. With this in mind, the periodic structure of the frame is shown in FIG. 2. This will allow the impulse response of the channel to be determined at time kT, (N+K)T, (2N+k)T, etc.

The determination of the impulse response can be simplified by reverting to the concept of cyclic convolution described in A. V. Opeenhein and R. W. Schaffer, "Digital Signal Processing", Englewood Cliffs, N.J., Prentice-Hall, 1975, by properly choosing the known training sequence.

Assume that the symbols in the training sequence satisfy the following identities:

$$a_5 = a_0 \quad (6)$$
$$a_6 = a_1$$
$$a_7 = a_2$$
$$a_8 = a_3$$

In this case, the relevant equations in the set 5 can be rewritten as:

$$r_{m+4} = a_4 f_{-1} + a_3 f_0 + a_2 f_1 + a_1 f_2 + a_0 f_3 \quad (7)$$
$$r_{m+5} = a_0 f_{-1} + a_4 f_0 + a_3 f_1 + a_2 f_2 + a_1 f_3$$
$$r_{m+6} = a_1 f_{-1} + a_0 f_0 + a_4 f_1 + a_3 f_2 + a_2 f_3$$
$$r_{m+7} = a_2 f_{-1} + a_1 f_0 + a_0 f_1 + a_4 f_2 + a_3 f_3$$
$$r_{m+8} = a_3 f_{-1} + a_2 f_0 + a_1 f_1 + a_0 f_2 + a_4 f_3$$

This last set of equations can be interpreted as the cyclic convolution of the sequence $$a = \{a_4, a_0, a_1, a_2, a_3\}$$

with the sequence f in Eq. (4), i.e., $$r = a \bigcirc f$$

where $\bigcirc$ stands for cyclic convolution. This last equation can be solved using DFT's, $$F = DFT(f) = DFT(r)\frac{1}{DFT(a)} \quad (8)$$

and $$f = DFT^{-1}(F) \quad (9)$$

Note that in Eq. (8) no division is necessary since the sequence a and thus its inverse DFT are known at the receiver.

The training sequence effectively sounds periodically the channel at five equally spaced frequencies. Therefore, it should be chosen to have a spectral density as flat as possible. The sequence chosen in the present example is the following:

$$a_0 = (-1 + j1)$$
$$a_1 = (-3 - j3)$$
$$a_2 = (+3 + j3)$$
$$a_3 = (-3 - j3)$$
$$a_4 = (-1 + j1)$$

The procedure expressed above allows the determination of the impulse response of the channel at discrete times say kT, (N+k)T, (2N+k)T, where N is the length of the frame in symbols. If the channel was slowly time varying, it could be assumed that its impulse response does not change during a frame. When this is the case, equations similar to Eq. (5) can be written for the entire frame. Symmetries in the resulting set of equations can then be exploited to solve the system of equations using the Levinson algorithm - see S. Crozier, D. Falconer and S. Mahmound, "Short-block equalization techniques for fading time-dispersive channels", Proc. Conf. Vehicular Technology, pp. 142-146, 1989. Two techniques known as least sum of squared errors (LSSE) and decision feedback block equalization (DFBE) are presented in that paper. Unfortunately in the present case, to achieve a moderate to low overhead, i.e., N>>9 (length of the training sequence in this example), the assumption of constant impulse response has to be dropped. The first implication is that the symmetric assumptions of Crozier et al cannot be used anymore.

Several possibilities exist to estimate the impulse response of the channel between training sequences. Among them are linear, parabolic or ideal interpolation. In the preferred embodiment of the present invention linear interpolation is used for simplicity.

Assume that at time mN, the impulse response of the channel is estimated to be $f^{mN}$ while at time (m+1)N, the estimated impulse response is $f^{(m+1)N}$, then using linear interpolation, we can write $$f^k = \frac{f^{(m+1)N} - f^{mN}}{N}(k - mN) + f^{mN} \quad (11)$$

for $mN + 1 \leq k \leq (m+1)N$

Using the impulse response estimation technique of the last subsection, the DFE 26 (FIG. 3) is implemented in the following manner. The samples at the output of the receiver between training intervals are stored in frame storage 21. Once the training sequence is received, the impulse response of the channel at the training instant is estimated in evaluator 22. Interpolation is then used between the last estimated impulse response and the present one to compute it between training intervals. For every stored channel sample, the DFE coefficients are computed according to Eqs. (1) and (3). The output of the DFE is compared to a set of predetermined thresholds to derive the estimated symbols. For the first few symbols, the symbols of the known training sequence can be used in the feedback part of the DFE instead of the estimated symbols.

A further refinement of the method is as follows. It has been shown in J. Salz, "Optimum means-square decision feedback equalization", Bell Syst. Tech. J., vol. 52, no. 8, pp. 1341-1373, October 1973. that the performance of a finite DFE depends on the sampling instant. As an example, consider a partial response scheme of the (1+D) class (J. G. Proakis, Digital Communications, New York, N.Y., McGraw-hill, 1983). If the right sampling instant is chosen, a DFE having one forward tap and one feedback tap can be used to equalize the channel. At any other sampling instant, the required length grows. The refinement consists of the following steps. The output of the channel is sampled at time instants say nT and nT+T/2. From the samples at times nT we derive an estimated impulse response, say $f^0$, while from those at times nT+T/2, we derive $f^{\frac{1}{2}}$. Two sets of interpolated impulse responses are then derived, one corresponding to samples of the channel at times nT and a second one corresponding to the samples at times $nT+T/2$. In order to choose between the two interpolated impulse responses we compute for every training sequence the following ratios:

$$\rho_0 = \left| \frac{f_0^0}{f_{-1}^0} \right|$$

$$\rho_{\frac{1}{2}} = \left| \frac{f_0^{\frac{1}{2}}}{f_{-1}^{\frac{1}{2}}} \right| \quad (12)$$

We define the difference $\Delta$ to be equal to $$\Delta = \rho_0 - \rho_{\frac{1}{2}} \quad (13)$$

Suppose that at time mNT, time when an impulse response estimation occurs, Eq. (13) leads the result $\Delta_{mN}$ while at the next estimation instant, $(m+1)NT$, we get $\Delta_{(m+1)N}$, then for every channel sample between those two instants we compute:

$$\Delta_k = (\Delta_{(m+1)N} - \Delta_{mN}) \frac{k - mN}{N} + \Delta_{mN} \quad (14)$$

for $m \leq k \leq (m + N)$

Now, the choice is made between the two sets of interpolated impulse response according to the following criteria:

if $\Delta_k \geq 0$ choose the impulse response corresponding to samples taken at time nT and the corresponding channel samples if $\Delta_k < 0$ choose the impulse response corresponding to samples taken at times $nT+T/2$ and the corresponding channel samples.

This method of selection can be intuitively understood as choosing the impulse response having either more energy concentrated in its $f_0$ sample or less non-causal energy (with respect to $f_0$). Although only two sampling instants have been considered, the above procedure could be generalized to multiple sampling instants and multiple choices of impulse responses.

It will also be understood that this method of selection of impulse responses for different time instances is useful even without the method of interpolating between impulse response at either end of the frame. If the rate of change of impulse response was known approximately and was known to be fairly constant, extrapolation from the impulse response at the start of the frame could be used, and the idea of selection from different impulse responses could be used to provide a significant improvement in performance, though this is generally a less preferred embodiment.

Referring again to the preferred embodiment, to minimize error propagation effects in the DFE a "double ended" approach is introduced. Assume that the frame consists of N symbols. The above described impulse response estimation and decoding procedures are used for symbols say 0 to N/2 while for symbols N/2 through N, the time axis is "reversed" and the decoding is done from N to N/2. Using the proposed impulse response estimation technique through the use of cyclic convolution, it can be shown that the coeffecients of the "reverse" impulse response are equal to a permutation of the coefficients of the "forward" impulse response. This implies that the impulse response needs to be estimated for the "forward" case only. A flow diagram of the decoding procedure is presented in FIG. 4.

Figure 4:
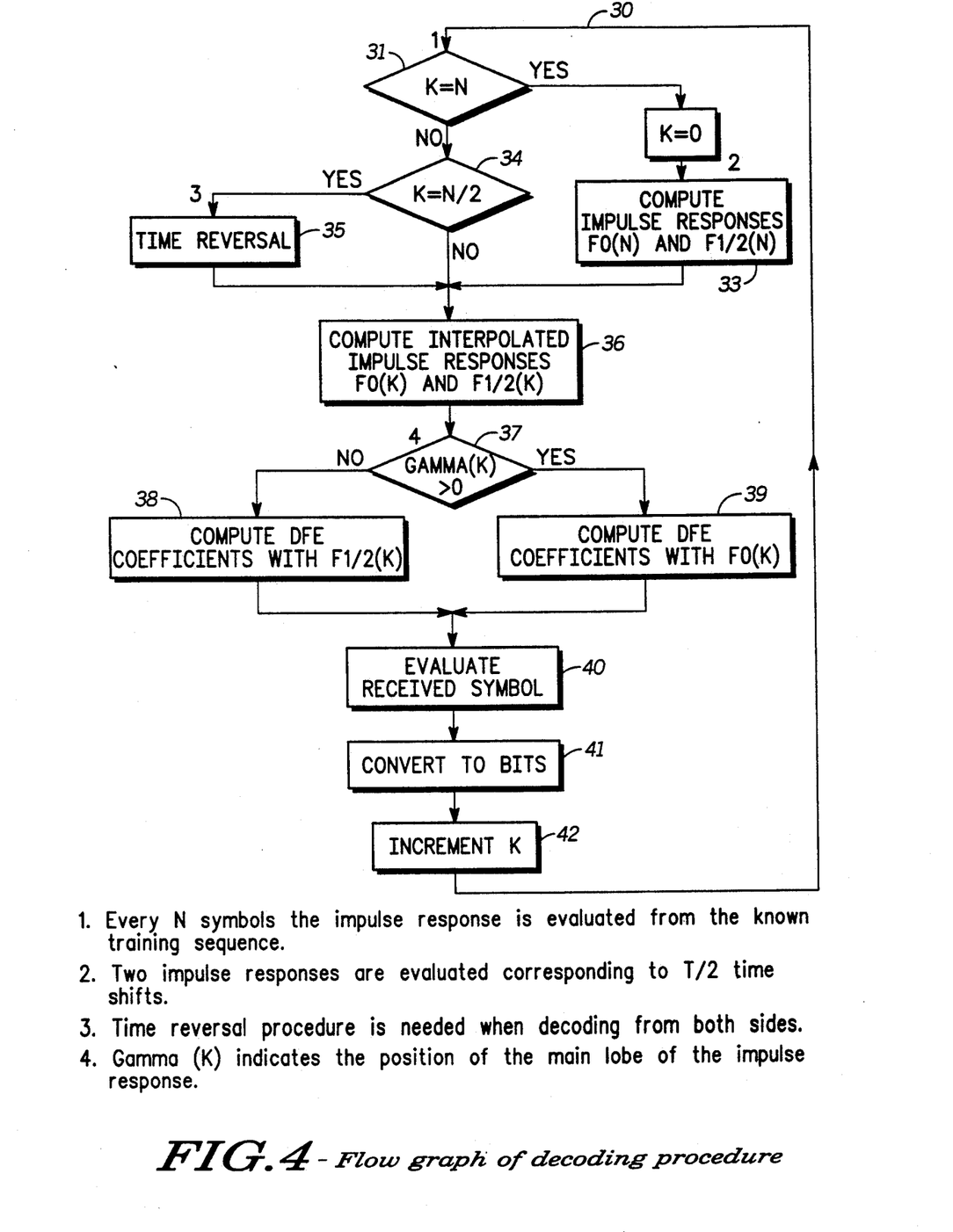
FIG. 4 shows a flow diagram of the decoding procedure of the first embodiment of the invention.

In FIG. 4, k is the current symbol. The main loop 100 is executed for each symbol, and every N symbols, the impulse response in the immediately following training period is evaluated from the known training sequence. Thus, in step 31, if k=N, a complete frame of symbols has been evaluated and, in step 33, the impulse responses are computed. Two impulse responses are evaluated corresponding to T/2 time shifts. Halfway through the frame, step 34 determines that symbols numbers 1−N/2 have been evaulated, whereupon the time axis is reversed in step 35 for evaluation of the remaining symbols of the frame. In step 36, the impulse responses f0(k) and f½(k) for the symbol in question are computed by linear interpolation between the known impulse response at the beginning of the frame and the known impulse response at the end of the frame. In step 37, $\Delta(k)$, as defined in Eq. (14), is tested for positive or negative sign, and according to the result, the DFE coefficients are computed with f½(k) or f0(k) in step 38 or 39 respectively. $\Delta(k)$ indicates the position of the maximum energy concentration of the impulse response. Once the DFE coefficients are computed, the received symbol is evaluated in step 40, is converted into bit form in accordance with FIG. 2, the symbol counter is implemented in step 42 and the loop 40 is repeated.

Figure 5:
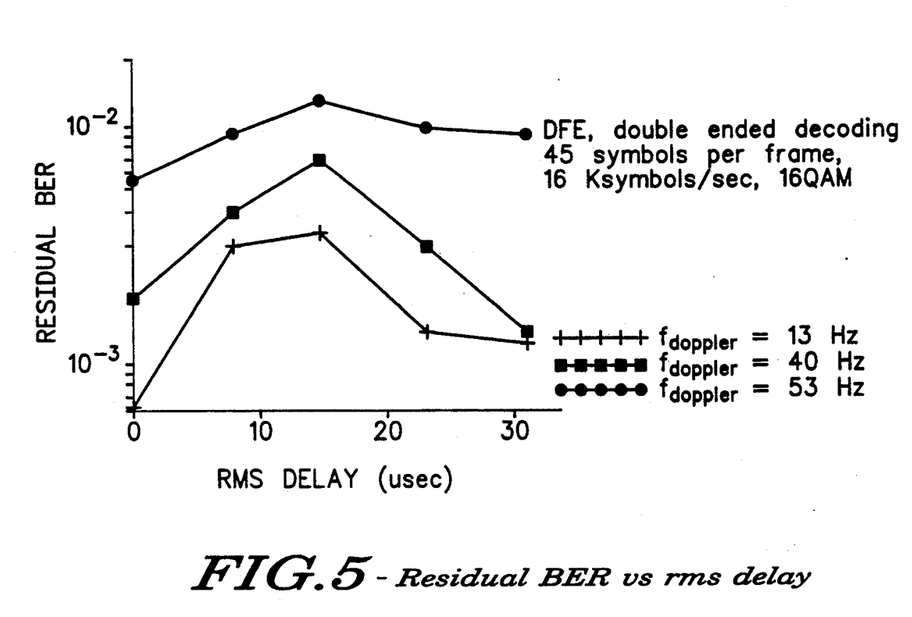
FIG. 5 shows the residual bit error rate verus RMS delay achieved using the invention.

In order to highlight the performance of this technique, simulations results are presented. The residual bit error rate under multipath and Rayleigh fading conditions is depicted in FIG. 5 as a function of the rms delay spread $\tau$ for different doppler frequencies of a moving vehicle. The doppler frequency $f_d$ is given by $$f_d = \frac{f}{c} v \quad (15)$$

where f is the transmission frequence, c is the speed of light and v is the vehicle speed. The technique proposed can effectively equalize the channel and achieve a residual BER under 2% for the range of delays and doppler frequency considered. For a frame length N=45 and a training sequence 9 symbols long, the overhead is only 20%. If 16 QAM with 16k symbols/sec is used, a net bit rate higher than 50 kbps can be achieved.

Figure 6:
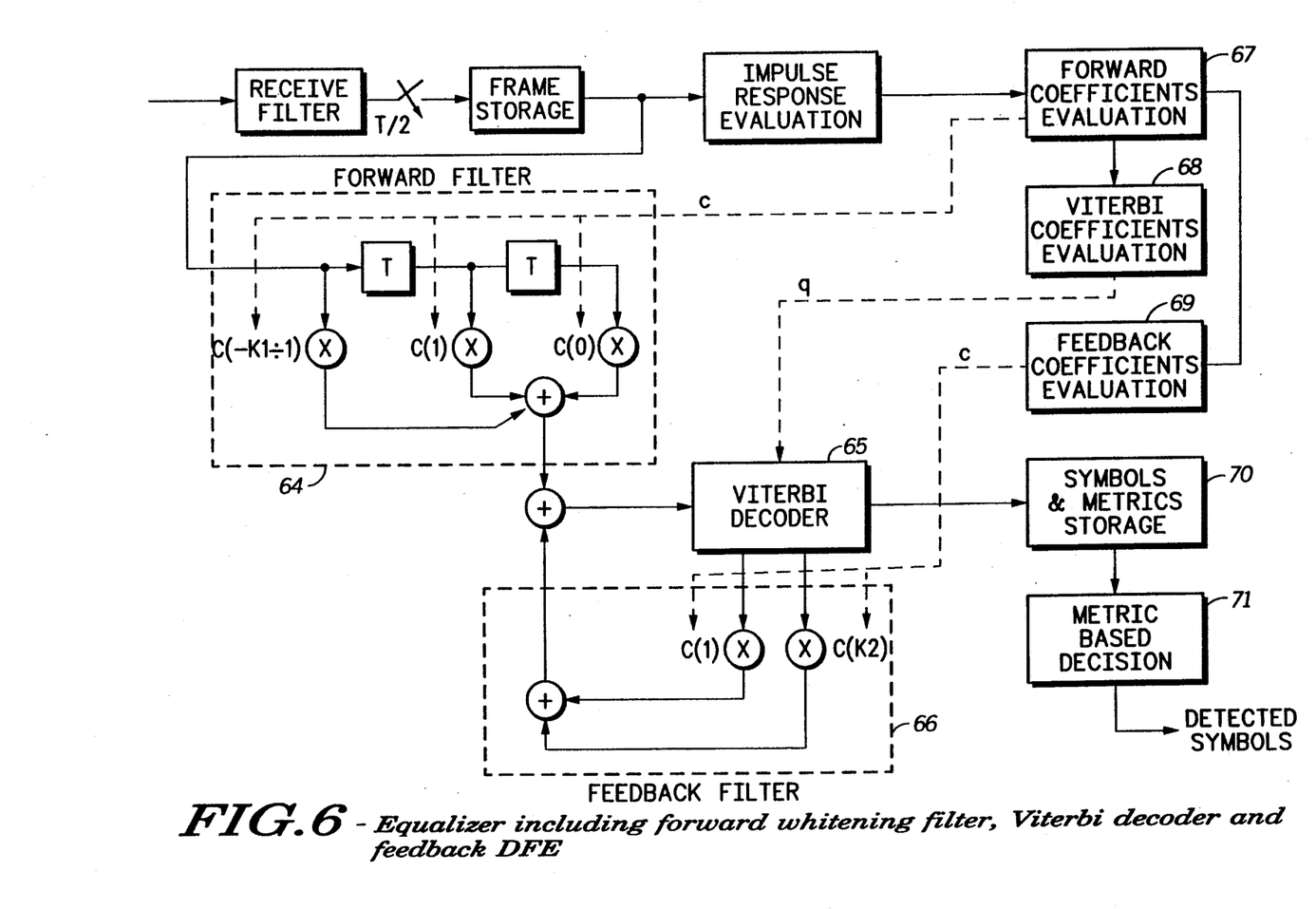
FIG. 6 shows a block diagram of the receiver and equalizer in accordance with a second embodiment of the invention.

A second embodiment of the invention will now be described with reference to FIG. 6. The transmitter, channel model, frame structure and impulse response determination process are identical to those described with reference to the first embodiment. The receive filter 20, frame storage memory 21, and impulse response evaluator 22 are as shown in FIG. 3 and as described above. In place of The forward filter 64 is the same as the forward filter 24 although an extra delay and an extra tap are shown. In place of the slicer 25 is a Viterbi decoder, similar to that presented in G D Forney "Maximum Likelihood Sequence Estimation of Digital Sequences in the Presence of ISI", IEEE Trans on Information Theory vol. IT-18, pp. 363–378, May 1972. In place of the feedback equalizer 26 is a feedback filter 66. The forward filter 64 comprises 2 delay elements and 3 taps. The feedback filter 66 comprises 2 taps from the Viterbi decoder 65. It will, of course, be understood that more complex forward and feedback filters could be used. A forward coefficient evaluator 67, a Viterbi coefficient evaluator 68 and a feedback coefficient evaluator 69 are provided, the operation of which is described below. A memory 70 is provided for storing the symbols output from the Viterbi decoder 65 and for storing metric values from the Viterbi decoder. Metric based decision means 71 are provided for further calculation described below. The final detected symbols are output after the metric based decision.

The operation of the equalizer is as follows. The samples at the output of the receiver between training intervals are stored. Once the training signature is received, the impulse response of the channel at the training instant is estimated. Interpolation is used between the last estimated impulse response and the present one to compute it between training intervals. For every stored channel sample, the coefficiencts of the forward filter 64 are computed according to equations (1) and (2). The impulse response from the input to the transmitter to the output of the forward filter is given by equation.

$g = f\ c$ where stands for convolution and $g = \{g0, g1, g2, \ldots\}$

Since the complexity of the Viterbi equalizer (2) is proportional to $M^{L-1}$, where M is the number of transmitted symbols and L the length of the impulse response at its input, it is clear that if the dimension of g is large, the Viterbi decoder becomes extremely complicated.

This can be solved by using a hybrid Viterbi-DFE equalization where the Viterbi decoder takes care of the first 1 (1 equal two or three) terms of g and the remaining terms are taken care of with a feedback DFE equalizer. This scheme is presented in FIG. 6.

The coefficients of the feedback equalizer 66 are computed according to equation (4). The symbols entering the feedback part of the equalizer are extracted from the Viterbi decoder 65 after a delay of 1 symbols. This avoids the use of an extra decision device in the system. The operation of the Viterbi decoder is well described in the above paper by Forney and also in "The Viterbi Algorithm", Proc. IEEE vol. 61, no. 3, pp. 268–273, March 1983.

As for the first embodiment of the invention, the equations (5), (6) and (7) are calculated and the choice is made to select the "best" impulse response.

A "double-ended" approach similar to that used above can also be applied.

Figure 7:
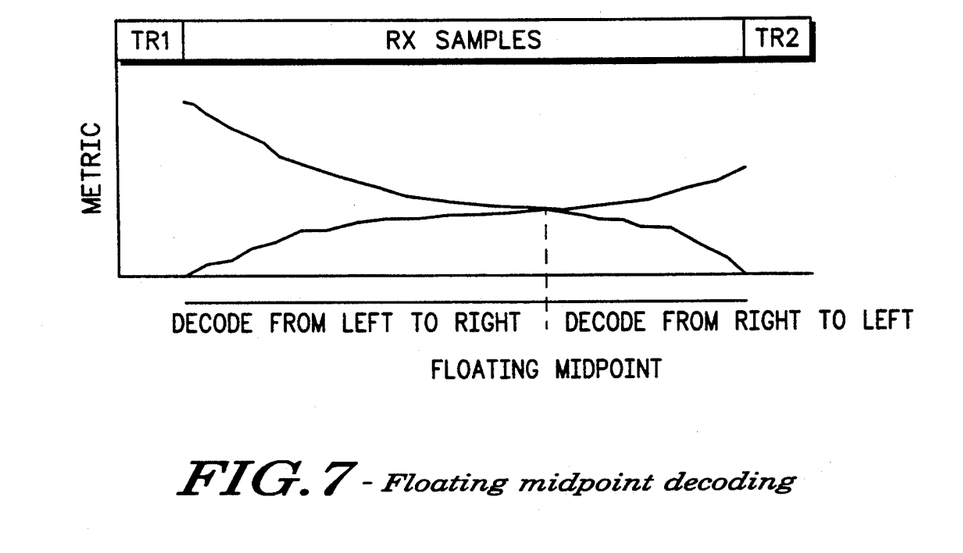
FIG. 7 shows a graph of the metric output of the Viterbi decoder of FIG. 6 throughout the frame for forward and reverse decoding.
Figure 8:
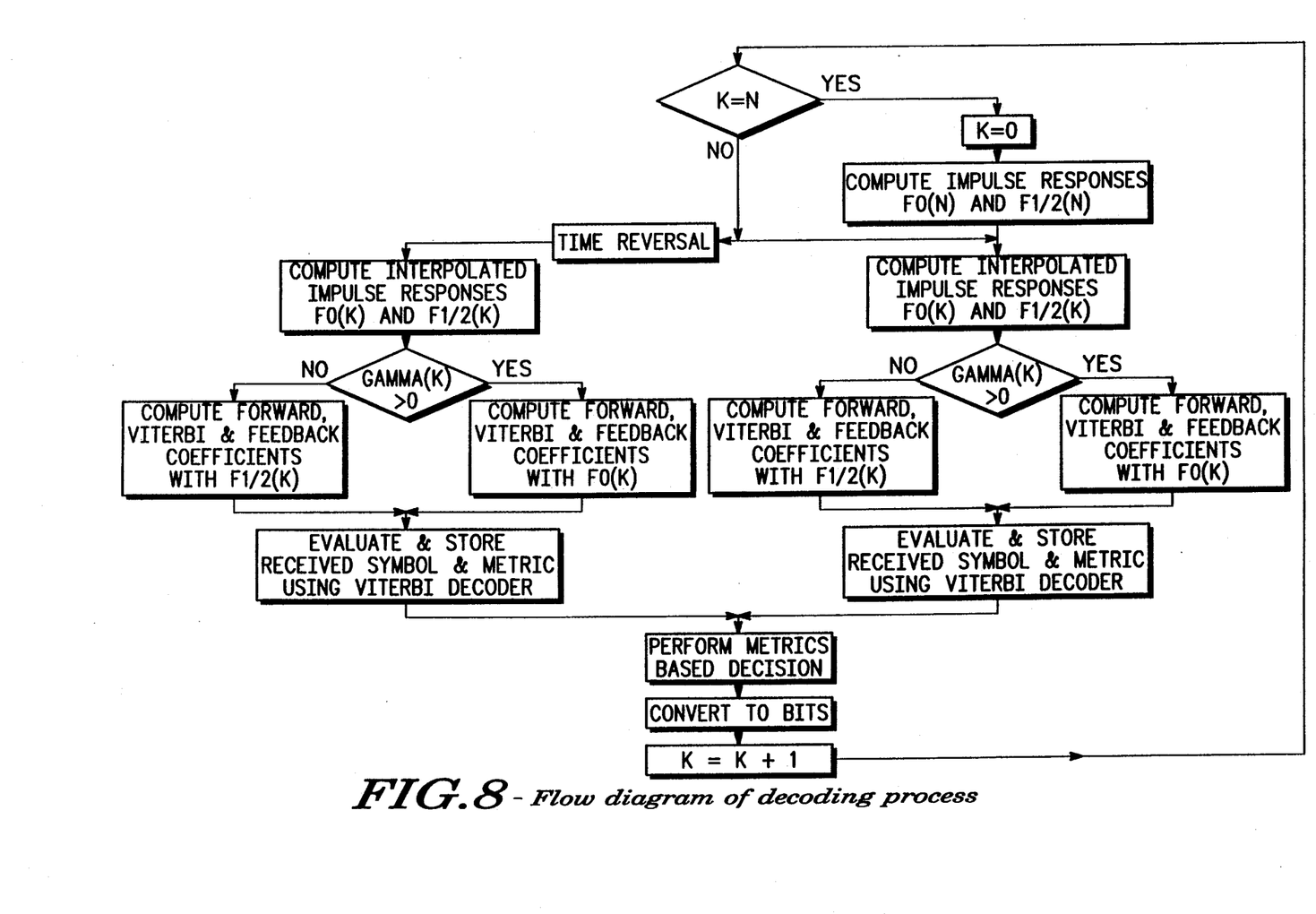
FIG. 8 shows a flow diagram of the decoding procedure of the second embodiment of the invention.

A further refinement is possible in this case with the use of the Euclidian metric accumulation of the Viterbi decoder. Instead of decoding the frame from 0 to N/2 and from N to N/2, the frame is decoded twice. Once from 0 to N and once from N to 0 using the 'time reversal' procedure. The decoded symbols are stored together with their corresponding accumulated Euclidian metric from the Viterbi decoder. Once the two decoded streams are available a final decision is made on the symbol resulting in the lower accumulated Euclidian metric. This has an effect of floating the midpoint in the decoding process. The decoding procedure is illustrated in FIG. 7. A flow diagram of this decoding procedure is presented in FIG. 8.

In order to reduce the complexity of the scheme, the following modification is introduced. The interpolated impulse response is updated for every symbol but the coefficients of the forward filter are updated only every NUP symbols. This implies that the system of equation (1) needs to be solved only once every NUP symbols. The coefficients of the Viterbi decoder as well as those of the feedback part of the DFE are updated every symbol. This symbol rate update of these latter coefficients compensates in part for the lack of updating in the forward filter coefficients.

The second embodiment of the invention provides substantially superior decoding to the first embodiment, and there is only minor loss of efficiency over different values of NUP.

I claim:

1. An equalizer for equalizing a linear modulated signal, the linear modulated signal containing a first training sequence, followed by samples, and followed in turn by a second training sequence, the linear modulated signal being received over a radio channel, the equalizer comprising:

input means for inputting the linear modulated signal, storage means coupled to the input means for storing at least the samples, thus forming stored received samples;

estimating and interpolating means coupled to the storage means for estimating a first impulse response for the channel based on the first training sequence thus forming a first estimated impulse response, and for estimating a second impulse response for the channel based on the second training sequence thus forming a second estimated impulse response, and for interpolating between the first estimated impulse response and the second estimated impulse response; and, digital filter means coupled to the storage means and having adjustable coefficients and including means for reading and equalizing the stored received samples, the digital filter means including means for adjusting the adjustable coefficients based on the first estimated impulse response and the second estimated impulse response, the adjustable coefficients being adjusted between samples.

2. The equalizer of claim 1, wherein the estimating and interpolating means include means for performing a linear interpolation operation using the first estimated impulse response and the second estimated impulse response.

3. The equalizer of claim 1, wherein the digital filter means further comprises:

a forward FIR filter having a forward filter FIR input coupled to the storage means and having a forward FIR filter output, combining means coupled to the forward FIR filter output for combining the forward FIR output with a feedback signal, the combining means having a combining means output;

decision means coupled to the combining means output;

a feedback FIR filter means responsive to the decision means for providing the feedback signal; and, an output coupled to the decision means for outputting equalized samples.

4. The equalizer of claim 3, wherein the decision means includes a slicer.

5. An equalizer for equalizing a linear modulated signal, the linear modulated signal containing periodic predetermined sequences for training, the linear modulated signal including a first training sequence followed by samples followed in turn by a second training sequence, the linear modulated signal being received over a radio channel, the equalizer comprising:

input means for inputting the linear modulated signal;

storage means coupled to the input means, for storing at least the samples, thus forming stored received samples;

estimating and interpolating means coupled to the storage means and responsive to inputting of the first training sequence to the input means for estimating a first impulse response for the channel based on the first training sequence thus forming a first estimated impulse response, and responsive to inputting of the second training sequence to the input means for estimating a second impulse response for the channel based on the second training sequence thus forming a second estimated impulse response, and for interpolating between the first estimated impulse response and the second estimated impulse response;

digital filter means having adjustable coefficients, coupled to the storage means and including means for reading and equalizing the stored received samples, wherein the digital filter means including means responsive to the estimating and interpolating means for adjusting the adjustable coefficients based on the first estimated impulse response and the second estimated impulse response, the adjustable coefficients being adjusted between samples, and wherein the digital filter means comprises:

a forward FIR filter having an input coupled to the storage means and having an output, the forward FIR filter including means responsive to the estimating and interpolating means for adjusting the adjustable coefficients at a first rate;

combining means coupled to the output of the forward FIR filter for combining the output with a feedback signal, the combining means including a combining means output;

decision means coupled to the combining means output;

a feedback FIR filter responsive to the decision means including means for providing the feedback signal, said feedback FIR filter having adjustable coefficients and including means responsive to the estimating and interpolating means for adjusting the adjustable coefficients at a second rate, the second rate being higher than the first rate; and, an output coupled to the decision means to output equalized samples.

6. An equalizer for equalizing a linear modulated signal, the linear modulated signal containing periodic predetermined sequences for training, the linear modulated signal including a first training sequence followed by samples followed in turn by a second training sequence, the linear modulated signal being received over a radio channel, the equalizer comprising:

input means for inputting the linear modulated signal;

storage means coupled to the input means, for storing at least the samples, thus forming stored received samples, estimating and interpolating means coupled to the storage means and responsive to inputting of the first training sequence to the input means for estimating a first impulse response for the channel dependent on the first training sequence thus forming a first estimated impulse response, and responsive to inputting of the second training sequence to the input means for estimating a second impulse response for the channel dependent on the second training sequence thus forming a second estimated impulse response, and for interpolating between the first estimated impulse response and the second estimated impulse response;

digital filter means having adjustable coefficients, coupled to the storage means and including means for reading and equalizing the stored received samples; and, setting means responsive to the estimating and interpolating means for setting the adjustable coefficients based on the first estimated impulse response and the second estimated impulse response, the adjustable coefficients being set between samples;

wherein the setting means and the digital filter means are arranged to set the adjustable coefficients for a first half of a frame between training sequences and to decode symbols in the first half of the frame in a sequence forward in time and to use a permutation of the adjustable coefficients to determine the adjustable coefficients for a second half of the frame, and to decode the second half of the frame in a sequence reversed in time.

7. An equalizer for equalizing a linear modulated signal, the linear modulated signal containing periodic predetermined sequences for training, the linear modulated signal including a first training sequence followed by samples followed in turn by a second training sequence, the linear modulated signal being received over a radio channel, the equalizer comprising:

input means for inputting the linear modulated signal;

storage means coupled to the input means, for storing at least the samples, thus forming stored received samples, estimating and interpolating means coupled to the storage means and responsive to inputting of the first training sequence to the input means for estimating a first impulse response for the channel based on the first training sequence thus forming a first estimated impulse response, and responsive to inputting of the second training sequence to the input means for estimating a second impulse response for the channel based on the second training sequence thus forming a second estimated impulse response, and for interpolating between the first estimated impulse response and the second estimated impulse response;

digital filter means having adjustable coefficients, coupled to the storage means and including means for reading and equalizing the stored received samples; and, setting means responsive to the interpolation means for setting the adjustable coefficients based on the first estimated impulse response and the second estimated impulse response, the adjustable coefficients being set between samples, wherein the setting means and the digital filter means are arranged to set the adjustable coefficients for a first part of a frame between training sequences and to decode symbols in the first part of the frame in a sequence forward in time and to use a permutation of the adjustable coefficients to determine the adjustable coefficients for a second part of the frame and to decode the second part of the frame in a sequence reversed in time and wherein the first part of the frame and the second part of the frame being variable in length, separated by a floating midpoint, the position of the midpoint being determined by a measure of quality of decoding throughout the frame for forward decoding and reverse decoding, thereby using forward decoding when forward decoding provides a higher measure of quality of decoding and further using reverse decoding when reverse decoding provides a higher measure of quality of decoding.

8. The equalizer of claim 7, further including a Viterbi equalizer arranged for performing the equalizing and further arranged for providing the measure of quality of decoding.

9. An equalizer for equalizing a linear modulated signal, the linear modulated signal containing periodic predetermined sequences for training, the linear modulated signal including a first training sequence followed by samples followed in turn by a second training sequence, the linear modulated signal being received over a radio channel, the equalizer comprising:

input means for inputting the linear modulated signal;

storage means coupled to the input means, for storing at least the samples, thereby forming stored received samples, estimating and interpolating means coupled to the storage means and responsive to inputting of the first training sequence for estimating a first impulse response for the channel based on the first training sequence thus forming a first estimated impulse response, and responsive to inputting of the second training sequence for estimating a second impulse response for the channel dependent on the second training sequence thus forming a second estimated impulse response, and for interpolating between the first estimated impulse response and the second estimated impulse response;

digital filter means having adjustable coefficients, coupled to the storage means and including means for reading and equalizing the stored received samples, wherein the digital filter means includes means responsive to the estimating and interpolating means for adjusting the adjustable coefficients based on the first estimated impulse response and the second estimated impulse response, the adjustable coefficients being adjusted between samples;

means for calculating, for every training sequence, the ratios $r_0$ and $r_{\frac{1}{2}}$, where:

$$r_0 = \left| \frac{f_0^0}{f_{-1}^0} \right| \quad \text{and} \quad r_{\frac{1}{2}} = \left| \frac{f_0^{\frac{1}{2}}}{f_{-1}^{\frac{1}{2}}} \right|$$

and where $f_0^0$ and $f_0^{\frac{1}{2}}$ are the coefficients of the forward impulse response of the channel for the current training sequence for sets of sample points offset by $\frac{1}{2}$ a sample interval and $f_{-1}^0$ and $f_{-1}^{\frac{1}{2}}$ are those coefficients for the immediately preceding training sequence;

means for calculating $D = r_0 - r_{\frac{1}{2}}$, means for calculating $$D_k = (D_{(m+1)N} - D_{mN}) \frac{k - mN}{N} + D_{mN}$$

for $m \leq k \leq (m + N)$, where $D_{(m+1)N}$ and $D_{mN}$ *are calculated at* successive estimation instances and k represents each channel sample between those instances;

and means for choosing the estimated impulse response corresponding to samples taken at times nT and the corresponding channel samples if $D_k > 0$ and choosing the estimated impulse response corresponding to samples taken at times $nT + T/2$ and the corresponding channel samples if $D_k < 0$.

10. An equalizer for equalizing a linear modulated signal, the linear modulated signal containing periodic predetermined sequences for training, the linear modulated signal including a first training sequence followed by samples followed in turn by a second training sequence, the linear modulated signal being received over a radio channel, the equalizer comprising:

input means for inputting the linear modulated signal;

storage means coupled to the input means, for storing at least the samples, thus forming stored received samples, estimating and interpolating means coupled to the storage means and responsive to inputting of the first training sequence for estimating a first impulse response for the channel dependent on the first training sequence thus forming a first estimated impulse response, and responsive to inputting of the second training sequence for estimating a second impulse response for the channel dependent on the second training sequence thus forming a second estimated impulse response, and for interpolating between the first estimated impulse response and the second estimated impulse response;

digital filter means having adjustable coefficients, coupled to the storage means for reading and equalizing the stored received samples, wherein the digital filter means includes means for adjusting the adjustable coefficients based on the first estimated impulse response and the second estimated impulse response, the adjustable coefficients being adjusted between samples;

means for calculating, for every training sequence, the ratios $r_0$ and $r_{\frac{1}{2}}$, where:

$$r_0 = \left| \frac{f_0^0}{f_{-1}^0} \right| \quad \text{and} \quad r_{\frac{1}{2}} = \left| \frac{f_0^{\frac{1}{2}}}{f_{-1}^{\frac{1}{2}}} \right|$$

and where $f_0^0$ and $f_0^{\frac{1}{2}}$ are the coefficients of the forward impulse response of the channel for the current training sequence for sets of sample points offset by $\frac{1}{2}$ a sample interval and $f_{-1}^0$ and $f_{-1}^{\frac{1}{2}}$ are those coefficients for the immediately preceding training sequence;

means for calculating $D = r_0 - r_{\frac{1}{2}}$, means for calculating $$D_k = (D_{(m+1)N} - D_{mN}) \frac{k - mN}{N} + D_{mN}$$

for $m \leq k \leq (m + N)$, where $D_{(m+1)N}$ and $D_{mN}$ *are calculated at* successive estimation instances and k represents each channel sample between those instances;

and means for choosing the estimated impulse response corresponding to samples taken at times nT and the corresponding channel samples if $D_k > 0$ and choosing the estimated impulse response corresponding to samples taken at times $nT + T/2$ and the corresponding channel samples if $D_k < 0$.

* * * * *